US010122045B2

(12) United States Patent
Morioka et al.

(10) Patent No.: US 10,122,045 B2
(45) Date of Patent: Nov. 6, 2018

(54) SOLID ELECTROLYTE MEMBRANE WITH FILM AND METHOD FOR PRODUCING SAME (71) Applicant: LINTEC Corporation, Tokyo (JP)

(72) Inventors: Takashi Morioka, Tokyo (JP); Tsuyoshi Mutou, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 271 days.

(21) Appl. No.: 15/123,089

(22) PCT Filed: Feb. 27, 2015

(86) PCT No.: PCT/JP2015/055787
§ 371 (c)(1),
(2) Date: Sep. 1, 2016

(87) PCT Pub. No.: WO2015/133388
PCT Pub. Date: Sep. 11, 2015

(65) Prior Publication Data
US 2017/0069933 A1 Mar. 9, 2017

(30) Foreign Application Priority Data
Mar. 6, 2014 (JP) .................................. 2014-044223

(51) Int. Cl.
H01M 10/0565 (2010.01)
H01M 10/0525 (2010.01)
(Continued)

(52) U.S. Cl.
CPC ......... H01M 10/0565 (2013.01); G01B 7/30 (2013.01); G01D 5/24485 (2013.01); H01B 1/06 (2013.01);
(Continued)

(58) Field of Classification Search
CPC ......... H01M 10/0565; H01M 10/0525; H01M 10/052; H01M 2300/0082; G01D 5/24485;
(Continued)

(56) References Cited

U.S. PATENT DOCUMENTS

2005/0271975 A1* 12/2005 McGimpsey .......... B05D 1/185
430/270.1
2007/0009776 A1 1/2007 Nodono
(Continued)

FOREIGN PATENT DOCUMENTS

CN 101978798 A 2/2011
CN 102543448 A 7/2012
(Continued)

OTHER PUBLICATIONS

Taiwanese Office Action issued in corresponding Taiwanese Patent Application No. 104106822, dated Jun. 21, 2018, with English Translation.
(Continued)

Primary Examiner — Eugenia Wang
(74) Attorney, Agent, or Firm — McDermott Will & Emery LLP (57) ABSTRACT A film-attached solid electrolyte membrane includes: a film having a surface that has a contact angle with respect to acetonitrile in a range from 35 to 75 degrees and a contact angle with respect to chloroform in a range from 15 to 40 degrees; and a solid electrolyte membrane in contact with the surface of the film. A manufacturing method of a film-attached solid electrolyte membrane includes: coating a solid-electrolyte-membrane-forming composition on a surface of a film that has a contact angle with respect to acetonitrile in a range from 35 to 75 degrees and a contact angle with respect to chloroform in a range from 15 to 40
(Continued)

degrees; and curing the coated solid-electrolyte-membrane-forming composition to form a solid electrolyte membrane.

4 Claims, 3 Drawing Sheets

(51) Int. Cl.

| | | |
|---|---|---|
| *H01M 10/052* | (2010.01) | |
| *H01B 1/10* | (2006.01) | |
| *H01B 1/08* | (2006.01) | |
| *H01B 1/06* | (2006.01) | |
| *G01B 7/30* | (2006.01) | |
| *G01D 5/244* | (2006.01) | |
| *H02P 6/182* | (2016.01) | |
| *H02P 21/06* | (2016.01) | |
| *H02P 6/16* | (2016.01) | |

(52) U.S. Cl.
CPC ............... *H01B 1/08* (2013.01); *H01B 1/10* (2013.01); *H01M 10/052* (2013.01); *H01M 10/0525* (2013.01); *H02P 6/182* (2013.01); *H02P 21/06* (2013.01); *H01M 2300/0082* (2013.01); *H02P 6/16* (2013.01); *Y02T 10/7011* (2013.01)

(58) Field of Classification Search
CPC . H02P 6/182; H02P 21/06; H02P 6/16; G01B 7/30; H01B 1/10; H01B 1/08; H01B 1/06; Y02T 10/7011
See application file for complete search history.

(56) References Cited

U.S. PATENT DOCUMENTS

| | | |
|---|---|---|
| 2009/0317684 A1 | 12/2009 | Yamashita et al. |
| 2013/0034729 A1 | 2/2013 | Taya et al. |

FOREIGN PATENT DOCUMENTS

| | | |
|---|---|---|
| CN | 102834900 A | 12/2012 |
| JP | H10-204172 A | 8/1998 |
| JP | 2000-195333 A | 7/2000 |
| JP | 2001-319692 A | 11/2001 |
| JP | 2004-296409 A | 10/2004 |
| JP | 2008-078128 A | 4/2008 |
| JP | 2009-026533 A | 2/2009 |
| JP | 2012-104263 A | 5/2012 |
| TW | 200423465 A | 11/2004 |
| TW | 200821338 A | 5/2008 |
| TW | 200951197 A | 12/2009 |
| TW | 201208000 A | 2/2012 |

OTHER PUBLICATIONS

International Preliminary Report on Patentability, which issued in corresponding International Application No. PCT/JP2015/055787, dated Sep. 6, 2016.
Chinese Office Action dated Jan. 26, 2018 issued in Chinese Patent Application No. 201580011300.2 (with English translation).
Search Report issued in corresponding International Application No. PCT/JP2015/055787, dated May 19, 2015.

* cited by examiner

SOLID ELECTROLYTE MEMBRANE WITH FILM AND METHOD FOR PRODUCING SAME

CROSS REFERENCE

This application is the U.S. National Phase under 35 U.S.C. § 371 of International Application No. PCT/JP2015/055787, filed on Feb. 27, 2015, which claims the benefit of Japanese Application No. 2014-044223, filed on Mar. 6, 2014, the entire contents of each are hereby incorporated by reference.

TECHNICAL FIELD

The present invention relates to a film-attached solid electrolyte membrane and a manufacturing method thereof.

BACKGROUND ART

Secondary batteries are typically used as power sources for portable electronics in view of their high energy density and high voltage. In accordance with the recent size and weight reductions and improvement in the performance of the portable electronics, improvement in the performance and safety of the secondary batteries has come to be increasingly demanded. The use of secondary batteries has spread to large-sized machineries such as electric-powered cars and home electricity storage systems.

Especially, studies on second batteries using a solid electrolyte have been made in view of their enhanced safety and long lifetime. Typically, in order to manufacture the solid electrolyte, Patent Literature 1 exemplarily discloses a method of coating a polymer solid electrolyte on a PET (polyethylene terephthalate) film to form a film of the polymer solid electrolyte. Further, Patent Literature 2 discloses a method of directly coating electrolyte solution on an electrode and heating and drying the coated electrolyte solution. As a further example, Patent Literature 3 discloses a method of casting and drying electrolyte solution on a mold and subsequently heating and pressurizing the electrolyte solution to obtain a film of solid electrolyte.

CITATION LIST

Patent Literature(s)

Patent Literature 1 JP-A-2001-319692
Patent Literature 2 JP-A-2012-104263
Patent Literature 3 JP-A-H10-204172

SUMMARY OF THE INVENTION

Problem(s) to be Solved by the Invention

However, cissing of the electrolyte solution is caused on a PET film to cause fluctuations in the shape, thickness, width and the like of the solid electrolyte membrane according to the typical methods. Further, the solid electrolyte membrane cannot be easily peeled off from the film or the mold and the solid electrolyte membrane is likely to be damaged.

An object of the invention is to provide a film-attached solid electrolyte membrane that is capable of restraining fluctuations in the shape of the solid electrolyte membrane and excellent in peelability of the film, and a manufacturing method thereof.

Means for Solving the Problem(s)

A film-attached solid electrolyte membrane according to an aspect of the invention includes: a film comprising a surface having a contact angle with respect to acetonitrile in a range from 35 to 75 degrees and a contact angle with respect to chloroform in a range from 15 to 40 degrees; and a solid electrolyte membrane in contact with the surface of the film.

In the film-attached solid electrolyte membrane according to the above aspect of the invention, it is preferable that the solid electrolyte film includes a polymer compound having a mass average molecular weight of 10,000 or more and a metal salt.

In the film-attached solid electrolyte membrane according to the above aspect of the invention, it is preferable that the metal salt is a lithium salt.

A manufacturing method of a film-attached solid electrolyte membrane according to another aspect of the invention includes: coating a solid-electrolyte-membrane-forming composition on a surface of a film that has a contact angle with respect to acetonitrile in a range from 35 to 75 degrees and a contact angle with respect to chloroform in a range from 15 to 40 degrees; and curing the coated solid-electrolyte-membrane-forming composition to form a solid electrolyte membrane.

According to the above aspect of the invention, a film-attached solid electrolyte membrane capable of restraining fluctuations in the shape of the solid electrolyte film and excellent in peelability of the film can be provided.

Further, when the solid electrolyte film includes a polymer compound having a mass average molecular weight of 10,000 or more and a metal salt, the film-attached solid electrolyte membrane is also excellent in terms of the mechanical strength and the flexibility.

When the metal salt is a lithium salt, the film-attached solid electrolyte membrane is capable of providing a solid electrolyte membrane having a high energy density and excellent electrical conductivity.

According to the above another aspect of the invention, a manufacturing method of manufacturing a film-attached solid electrolyte membrane capable of restraining fluctuations in the shape of the solid electrolyte film and excellent in peelability of the film can be provided.

DESCRIPTION OF EMBODIMENT(S)

Figure 1:
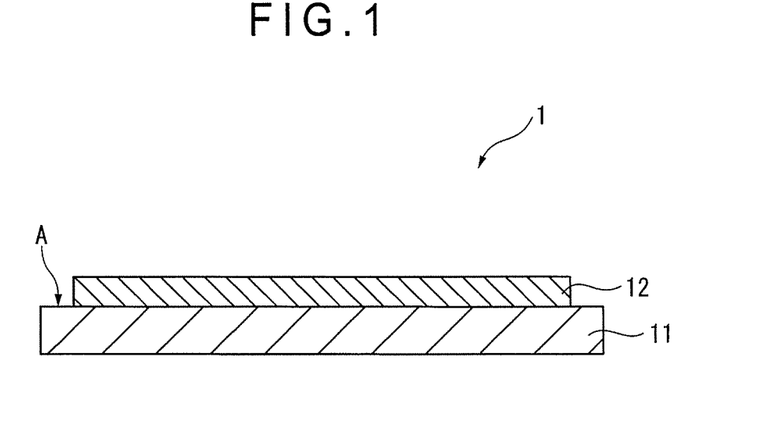
FIG. 1 is a cross section of a film-attached solid electrolyte membrane according to an exemplary embodiment of the invention.

Exemplary embodiment(s) of the invention will be described below with reference to the attached drawings.
Film-Attached Solid Electrolyte Membrane FIG. 1 is a cross section of a film-attached solid electrolyte membrane 1 according to an exemplary embodiment of the invention.

The film-attached solid electrolyte membrane 1 includes a film 11, and a solid electrolyte membrane 12 formed on a surface A of the film 11.

In this exemplary embodiment, the surface A of the film 11 in contact with the solid electrolyte membrane 12 has a contact angle with respect to acetonitrile in a range from 35 to 75 degrees and a contact angle with respect to chloroform in a range from 15 to 40 degrees. The contact angle with respect to acetonitrile on the surface A is preferably in a range from 55 to 65 degrees. The contact angle with respect to chloroform on the surface A is preferably in a range from 17 to 37 degrees.

When the contact angle on the surface A of the film 11 exceeds the upper limit of the above contact angle range, cissing is caused between the film 11 and the solid electrolyte membrane 12 on an upper side to fluctuate the shape (e.g. thickness and width) of the solid electrolyte membrane 12.

On the other hand, when contact angle on the surface A of the film 11 falls below the lower limit of the above contact angle range, the film 11 cannot be easily peeled off from the solid electrolyte membrane 12 in use to cause deformation of the solid electrolyte membrane 12.

It should be noted that the contact angle is measured by dropping two microliters of the solvent (acetonitrile or chloroform) on the surface A of the film 11 in contact with the solid electrolyte membrane, and calculating a static contact angle at a temperature of 23±5 degrees C. with an automatic contact angle meter using a half-angle method.

In order to control the contact angle on the surface A of the film 11 within the above range, a surface treatment (e.g. oxidation method) or a release treatment may be applied. Examples of the oxidation method include corona discharge treatment, plasma discharge treatment, (wet) chrome oxidation treatment, flame treatment, hot-air treatment, ozone treatment and ultraviolet irradiation treatment. Though the type of the surface treatment to be applied is selected in accordance with the nature of the film, the corona discharge treatment is generally favorably used in view of handlability and its effect for improving wetting tension.

The film 11 is not specifically limited as long as the contact angle on the surface A is restricted within the above range. For instance, the film may be selected from any of known bases to be directly used.

Examples of the material of the base include synthetic resin film, paper material, unwoven fabric, wooden material and metal foil. Examples of the synthetic resin film include polyester (e.g. polyethylene terephthalate and polyethylene naphthalate), polyolefin (e.g. polyethylene, polypropylene and polymethylpentene), polycarbonate, polyvinyl acetate, polyvinyl chloride, acryl, acrylonitrile•butadiene•styrene, polyimide, polyurethane and polystyrene. Examples of the paper material include quality paper, impregnated paper, glassine paper and coated paper.

The base may be a single-layered material or a multilayered material of the same or different materials. The base is preferably a synthetic resin film. The synthetic resin film is preferably a polyester film, more preferably a polyethylene terephthalate film, further more preferably a biaxially-oriented polyethylene terephthalate film. Since the polyethylene terephthalate film is unlikely to produce dust and the like during the processing and in use, coating failure due to the dust can be effectively prevented.

The thickness of the film 11 may be designed as desired in accordance with the usage thereof. The thickness of the film 11 is usually in a range from 10 µm to 300 µm, preferably in a range from 15 µm to 200 µm, more preferably in a range from 20 µm to 125 µm.

As another exemplary embodiment of the invention, the film 11 may be a film provided by coating a release agent on one of the surfaces of the base of the film to provide a release agent layer. It should be noted that, when the film 11 includes the release agent layer, the surface of the release agent layer has the contact angle within the above range and the solid electrolyte membrane 12 is formed on the surface of the release agent layer.

The release agent used for the release agent layer of the film 11 is not specifically limited. Examples of the release agent includes, in addition to the silicone-resin release agent, alkyd resin release agent, long-chain-alkyl-group-containing-compound release agent, acrylic release agent, olefin release agent (e.g. polyethylene), and rubber release agent (e.g. isoprene resin).

The silicone-resin release agent includes a solution release agent and a non-solution release agent. The solution silicone resin is diluted with a solvent to provide a coating liquid, so that a wide range of solution silicone resins ranging from highly viscous polymer with a high molecular weight to a low-viscosity polymer with a low molecular weight (oligomer) are usable. Accordingly, the releasability of the solution silicone resin is easily controlled as compared to the non-solution silicone resin and thus can be easily designed in accordance with the required performance (quality). The silicone-resin release agent can also be classified into an addition-reaction release agent, condensation-reaction release agent, ultraviolet curing release agent, electron-beam curing release agent and the like. The addition-reaction silicone resin is advantageous in that the addition-reaction silicone resin is highly reactive and excellent in productivity, and exhibits small change in the releasability and no cure shrinkage after production as compared to the condensation-reaction silicone resin. Accordingly, the addition-reaction silicone resin is preferably used as the release agent for the release agent layer.

The addition-reaction silicone resin is not specifically limited but various silicone resins are usable. For instance, silicone resins generally used for typical thermosetting addition-reaction silicone resin release agent are usable. The easily-thermosetting addition-reaction silicone resin is exemplified by a silicone resin having a functional group including an alkenyl group (e.g. vinyl group), an electrophilic group (e.g. hydrosilyl group) or the like in a molecule. Polydimethylsiloxane having the above functional group or a silicone resin using polydimethylsiloxane whose methyl groups are partially or entirely substituted by an aromatic functional group (e.g. phenyl group) are usable as the addition-reaction silicone resin.

The silicone-resin release agent may be added with other additive(s) as necessary. Examples of the other additive(s) include silica, silicone resin, antistatic agent, dye and pigment.

The method for curing the coated film of the silicone-resin release agent is not specifically limited. Examples of the method include heat treatment using an oven of a coater and ultraviolet irradiation after the heat treatment. The latter is preferable in terms of prevention of wrinkles caused by thermal shrinkage of the base, curability of silicone and adhesion of the release agent on the base.

When the ultraviolet irradiation is used in conjunction with the heat treatment in order to cure the coated film, it is preferable that the release agent is added with a photopolymerization initiator. The photopolymerization initiator is not specifically limited, but any generally usable photopolymerization initiator that generates radicals when being irradiated with ultraviolet or electron beam may be selected to be used. Examples of the photopolymerization initiator include benzoins, alkylphenones, benzophenones, acetophenones, alpha-hydroxyketones, alpha-aminoketones, alpha-diketones, alpha-diketonedialkylacetals, anthraquinones, thioxanthones, acylphosphine oxides, titanocenes, triaziness, bisimidazoles and oxime esters.

Alkyd resin having a cross-linked structure is exemplarily used as the alkyd resin release agent. The layer of the alkyd resin having a cross-linked structure may be formed by thermally curing a layer of thermosetting resin composition including an alkyd resin, cross-linking agent and, if necessary, curing catalyst. The alkyd resin may exemplarily be a modified product such as a long-chain-alkyl-modified alkyd resin and silicone-modified alkyd resin.

Examples of the long-chain-alkyl-group-containing-compound release agent include polyvinyl carbamates obtained by reacting polyvinylalcohol polymer with a long-chain alkyl isocyanate having 8 to 30 carbon atoms, and alkyl urea derivatives obtained by reacting a polyethylene imine with a long-chain alkyl isocyanate having 8 to 30 carbon atoms.

An acryl resin having a cross-linked structure is exemplarily used as the acrylic release agent. The acryl resin may exemplarily be a modified product such as a long-chain-alkyl modified acryl resin and silicone-modified acryl resin.

Crystalline olefin resins are exemplarily used as the olefin resin release agent. Preferable crystalline olefin resins are, for instance, polyethylene and crystalline polypropylene resins. Examples of the polyethylene include high-density polyethylene, low-density polyethylene, and linear low-density polyethylene. Examples of the crystalline polypropylene resins include propylene homopolymer having an isotactic structure or a syndiotactic structure, and a propylene-alpha-olefin copolymer. One of these crystalline olefin resins may be singly used, or a combination of two or more of the crystalline olefin resins may be used in combination.

Natural rubber resins and synthetic rubber resins are exemplarily used as the rubber release agent. Examples of the synthetic rubber resin include butadiene rubber, isoprene rubber, styrene-butadiene rubber, methyl methacrylate-butadiene rubber and acrylonitrile-butadiene rubber.

Among the above release agents, the silicone-resin release agent is preferable in order to control the contact angle with respect to acetonitrile and chloroform within the above range.

Though the thickness of the release agent layer is not specifically limited, the thickness is preferably in a range from 0.01 µm to 1 µm, more preferably in a range from 0.03 µm to 0.5 µm.

The shape of the film 11 is not specifically limited, and the shape of the film 11 may be variously designed in any shape such as polygons including rectangles (e.g. square and block rectangle), triangles, pentagons, and hexagons, circle, ellipses, indefinite shapes and elongated roll shape in view of the usage of the final products. In the exemplary embodiment, the solid electrolyte membrane 12 is exemplarily laminated on the film 11 in an elongated shape.

In the exemplary embodiment, the solid electrolyte membrane 12 is a polymer solid electrolyte membrane containing a polymer compound and a metal salt. The solid electrolyte membrane 12 may be in a form of a solid containing the polymer compound and the metal salt but not containing a solvent (solvent-free solid electrolyte membrane) or in a form of a gel (polymer gel electrolyte film) containing the polymer compound, the metal salt and a solvent. When the solid electrolyte membrane 12 is the polymer gel electrolyte film, the content of the solvent in the polymer gel electrolyte film is usually in a range from 30 mass % to 99 mass % of the total mass of the solid electrolyte membrane 12.

When the solid electrolyte membrane 12 is the solvent-free solid electrolyte membrane, the content of the polymer compound in the solid electrolyte membrane 12 is preferably in a range from 5 mass % to 99 mass % of the total mass of the solid electrolyte membrane 12, more preferably in a range from 10 mass % to 95 mass %.

When the solid electrolyte membrane 12 is the polymer gel electrolyte film, the content of the polymer compound in the solid electrolyte membrane 12 is preferably in a range from 0.5 mass % to 65 mass % of the total mass of the solid electrolyte membrane 12.

The polymer compound contained in the solid electrolyte membrane 12 preferably has a mass average molecular weight of 10,000 or more, more preferably a mass average molecular weight in a range from 10,000 to 1,000,000, further more preferably a mass average molecular weight in a range from 20,000 to 500,000. Specific examples of the polymer compound having a mass average molecular weight of 10,000 or more include ion-conductive polymers such as polyethylene oxides, polyethylene carbonates, polyacrylonitrile, polyvinylidene fluorides, poly(methyl methacrylate), polyhexafluoropropylene and polyethylene oxides.

When the mass average molecular weight of the polymer compound is 10,000 or more, the solid electrolyte membrane 12 exhibits excellent shape stability. Accordingly, the film-attached solid electrolyte membrane 1 has a favorable mechanical strength and excellent softness.

Various known metal salts are usable as the metal salt in view of the type of non-aqueous electrolyte secondary battery, the type of electroactive substance and the like. Examples of the metal salts include alkali metal salts such as a lithium salt and a sodium salt, and alkaline earth metal salts such as a magnesium salt and a calcium salt. Among the above, lithium salt is more preferable in view of its high energy density.

The metal salt may be present in the solid electrolyte in a form of anions of the alkali metal and counter ions of the anions. When the metal salt is a lithium salt, lithium ions are transferred through the polymer compound.

Examples of the lithium salt include $LiClO_4$, $LiBF_4$, $LiI$, $LiPF_6$, $LiCF_3SO_3$, $LiCF_3COO$, $LiNO_3$, $LiAsF_6$, $LiSbF_6$, $LiAlCl_4$, $LiCl$, $LiBr$, $LiB(C_2H_5)_4$, $LiCH_3SO_3$, $LiC_4F_9SO_3$, $Li(CF_3SO_2)_2N$, $Li(C_2F_5SO_2)N$ and $Li[(CO_2)_2]_2B$.

In this exemplary embodiment, the concentration of the metal salt in the solid electrolyte membrane 12 is not specifically limited. For instance, the value of the ratio (Ms/Mp) of a mass Ms of the metal salt to a mass Mp of the polymer compound in the solid electrolyte membrane 12 is preferably in a range from 0.01 to 10, more preferably in a range from 0.05 to 7.

The thickness of the solid electrolyte membrane 12 is preferably in a range from 1 µm to 300 µm, more preferably in a range from 10 µm to 100 µm, further preferably in a range from 20 µm to 70 µm.

With the thickness of the solid electrolyte membrane 12 within the above range, short-circuit can be avoided and the resistance can be kept at a low level.

Figure 3:
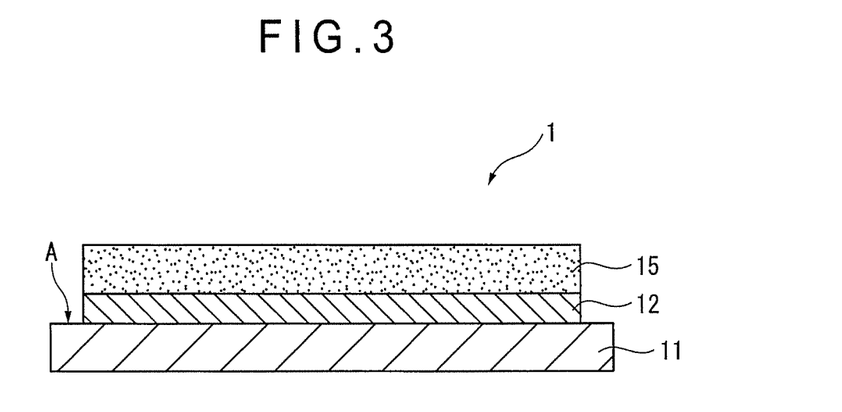
FIG. 3 is a cross section of a film-attached solid electrolyte membrane according to another exemplary embodiment of the invention.

It should be noted that the film-attached solid electrolyte membrane 1 may include a protection sheet 15 covering the solid electrolyte membrane 12 (see FIG. 3). The material of the protection sheet 15 is not specifically limited but is preferably a material adapted to be easily peeled off from the solid electrolyte membrane 12. The protection sheet 15 may include a release agent layer on the surface thereof. In this arrangement, the release agent layer may be formed on the surface of the protection sheet 15, and the protection sheet 15 may cover the solid electrolyte membrane 12 so that the release agent layer is in contact with the solid electrolyte membrane 12. The same base as that of the film 11 may be used for the protection sheet 15. The release agent for the release agent layer may be the same as the release agent for the above-described release agent layer.

Manufacturing Method

Next, a manufacturing method of the film-attached solid electrolyte membrane according to this exemplary embodiment will be described below.

Figure 2:
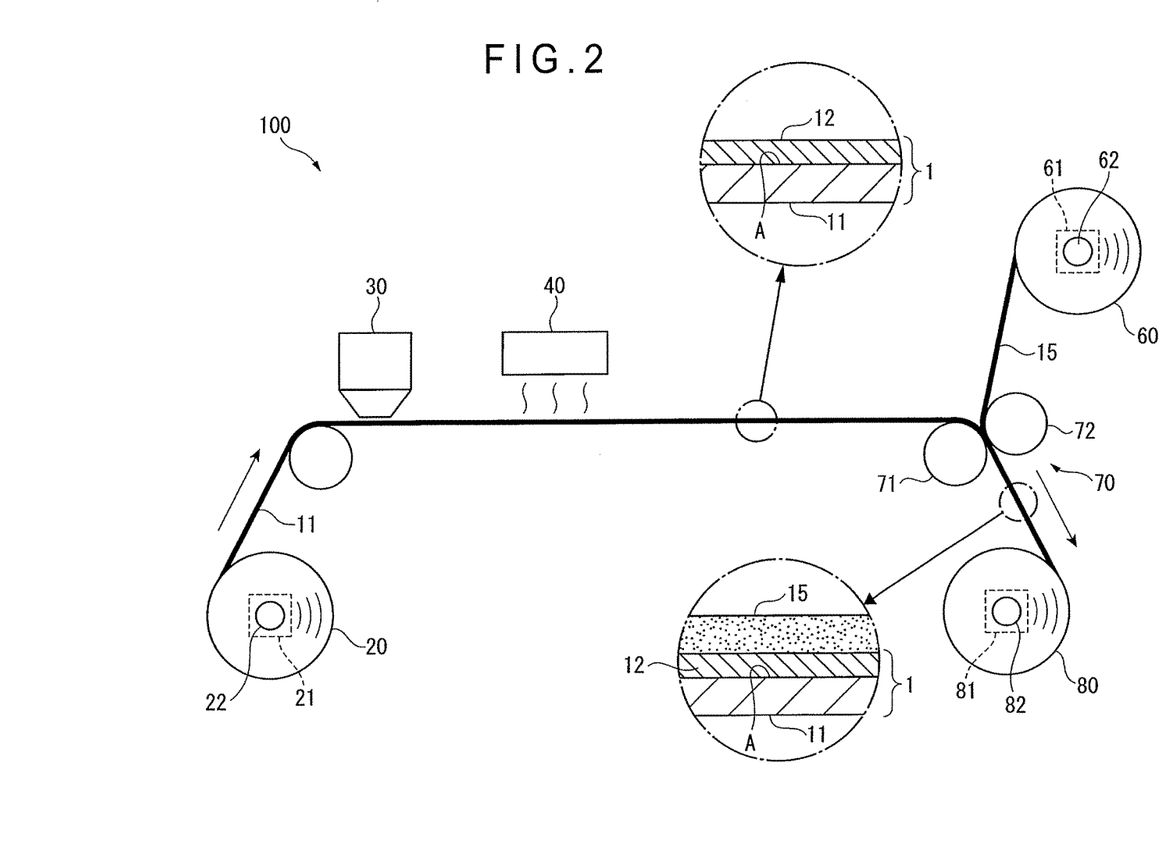
FIG. 2 schematically illustrates a manufacturing method of the film-attached solid electrolyte membrane of the invention.

FIG. 2 schematically shows the manufacturing method of the film-attached solid electrolyte membrane according to this exemplary embodiment.

In this exemplary embodiment, the film-attached solid electrolyte membrane 1 is manufactured using a manufacturing apparatus 100.

The manufacturing apparatus 100 includes a first feeder 20 configured to feed the film 11, a coater 30 configured to coat the solid-electrolyte-membrane-forming composition, a drier 40 configured to cure the coated solid-electrolyte-membrane-forming composition, a second feeder 60 configured to feed the protection sheet 15, a pasting unit 70 configured to paste the protection sheet 15 onto the film-attached solid electrolyte membrane 1, and a winding unit 80 configured to roll up the film-attached solid electrolyte membrane 1 pasted with the protection sheet 15.

The first feeder 20 includes a rotary motor 21 (drive unit), and a support roller 22 configured to be rotated by the rotary motor 21. The support roller 22 supports the film 11 in an elongated shape wound in a roll. The film 11 fed from the support roller 22 is delivered to the coater 30 with the conveying direction thereof being guided by a guide roller.

Coating Step

The coater 30 in this exemplary embodiment is configured to coat the solid-electrolyte-membrane-forming composition on the surface A of the film 11 whose contact angle with respect to acetonitrile is in a range from 35 degrees to 75 degrees and whose contact angle with respect to chloroform is in a range from 15 degrees to 40 degrees, thereby forming a coated film.

Examples of the coater 30 include a gravure coater, a knife coater, a roller coater, a die coater, a dip coater, a bar coater, a comma coater and a lip coater.

The solid-electrolyte-membrane-forming composition in this exemplary embodiment contains the polymer compound, the metal salt and the solvent. It should be noted that the solid-electrolyte-membrane-forming composition may contain other component(s) as necessary.

It is preferable that the composition contains the polymer compound having the mass average molecular weight of 10,000 or more. Further, it is preferable that the composition contains the metal salt in a form of a lithium salt.

The content of the polymer compound is preferably in a range from 5 mass % to 98 mass % of the total mass of the composition, more preferably in a range from 10 mass % to 94 mass %.

It is preferable that the content of the metal salt is in a range from 1 mass % to 94 mass % of the total mass of the composition, more preferably in a range from 5 mass % to 89 mass %.

The content of the solvent is usually 99 mass % or less of the total mass of the composition, more preferably 94 mass % or less, further preferably 85 mass % or less.

The solvent may be any solvent as long as the polymer compound is soluble in the solvent and the metal salt is evenly dispersible. Solvents usually used for slurry of an electrode of a non-aqueous electrolyte secondary battery are usable. Among the solvents, a solvent exhibiting excellent ion-conductivity due to its low viscosity and high ion mobility, its high electric permittivity and consequent enhancement in effective carrier concentration, or both, is preferable.

Examples of the solvent contained in the solid-electrolyte-membrane-forming composition of this exemplary embodiment include alkyl carbonates such as ethylene carbonate, propylene carbonate, dimethyl carbonate, diethyl carbonate, butylene carbonate and methylethyl carbonate, esters such as γ-butyrolactone and methyl formate, ethers such as 1,2-dimethoxy ethane and tetrahydrofuran, sulfolane, dimethylsulfoxide, acetonitrile and chloroform. Two or more of the solvents may be mixed to be used.

The method for preparing the solid-electrolyte-membrane-forming composition is not specifically limited. For instance, when the solid-electrolyte-membrane-forming composition contains the polymer compound and the metal salt, the composition may be prepared by polymerizing monomers to obtain the polymer compound and then blending the metal salt with the polymer compound, or by polymerizing monomers to prepare the polymer compound under the presence of the metal salt.

Solid Electrolyte Membrane Formation Step

The drier 40 cures the coated film formed by the coater 30. The film-attached solid electrolyte membrane 1 can be obtained by removing the solvent contained in the coated film and curing the coated film using the drier 40.

The drier 40 may include a plurality of drying sections that are adapted to be set at mutually different temperatures.

Examples of the drier 40 include a heat-wind circulation drier and a far-infrared drier.

The drying conditions (drying time, drying temperature etc.) may be appropriately set.

Protection Sheet Pasting Step

The second feeder 60 includes a rotary motor 61 (drive unit), and a support roller 62 configured to be rotated by the rotary motor 61. The support roller 62 supports the elongated protection sheet 15 wound in a roll. The protection sheet 15 fed from the support roller 62 is delivered to the pasting unit 70.

The pasting unit 70 includes a first pasting roller 71 around which the film-attached solid electrolyte membrane 1 is configured to be wrapped, and a second pasting roller 72 around which the protection sheet 15 is configured to be wrapped. The film-attached solid electrolyte membrane 1 and the protection sheet 15 pass through the nip between the first pasting roller 71 and the second pasting roller 72 to be pasted to form the film-attached solid electrolyte membrane 1 on which the protection sheet 15 is adhered. The film-attached solid electrolyte membrane 1 on which the protection sheet 15 is adhered is guided by the first pasting roller 71 and the second pasting roller 72 to a downstream at which the winding unit 80 is disposed.

Winding Step

The winding unit 80 includes a rotary motor 81 (drive unit) and a support roller 82 configured to be rotated by the rotary motor 81. The film-attached solid electrolyte membrane 1 with the protection sheet 15 being pasted is wound around the support roller 82 in a roll to be supported.

The film-attached solid electrolyte membrane 1 wound in a roll is cut into a predetermined shape to have a predetermined dimension, and usable as the film-attached solid electrolyte membrane 1 on which the protection sheet 15 is pasted.

Since the contact angle on the surface A of the film 11 in contact with the solid electrolyte membrane 12 is within the above predetermined range, the cissing between the film 11 and the solid electrolyte membrane 12 is restrained in the film-attached solid electrolyte membrane 1 of this exemplary embodiment. Consequently, the film-attached solid electrolyte membrane 1 of this exemplary embodiment restrains the fluctuation in the shape of the solid electrolyte membrane 12 while allowing easy peeling of the film 11. Further, since the film 11 can be easily peeled off, the solid electrolyte membrane 12 can be used for various purposes. For instance, the solid electrolyte membrane 12 can be adhered on an electrode after the film 11 is peeled off, thereby expanding the application of the solid electrolyte membrane 12.

Especially, the problem associated with the cissing becomes eminent when the concentration of the metal salt in the electrolyte solution is high and the concentration of the binder compound is low. However, the film-attached solid electrolyte membrane 1 of this exemplary embodiment restrains the cissing and the fluctuation in the shape of the solid electrolyte membrane 12 even when the concentration of the metal salt is high and the concentration of the binder polymer compound is low in the solid electrolyte membrane 12.

When the metal salt contained in the solid electrolyte membrane 12 is a lithium salt, the solid electrolyte membrane 12 sometimes exhibits tackiness. In this exemplary embodiment, since the film 11 is attached to the solid electrolyte membrane 12, handleability of the solid electrolyte membrane 12 is enhanced as compared to an instance in which the solid electrolyte membrane 12 is singly used. When the solid electrolyte membrane 12 exhibits tackiness, it is preferable that the solid electrolyte membrane 12 is covered with the protection sheet 15. Since the solid electrolyte membrane 12 is not exposed, the handleability is further enhanced. When the solid electrolyte membrane 12 is to be used, it is only necessary that the film 11 and the protection sheet 15 are sequentially peeled off.

In the manufacturing method of the film-attached solid electrolyte membrane according to this exemplary embodiment, the solid-electrolyte-membrane-forming composition is coated on the surface A having the contact angle within the above-described range to form the coated film. Accordingly, the cissing of the composition on the surface A is restrained, so that cissing of the solid electrolyte membrane 12 obtained by drying the coated film is also restrained. The film 11 can be easily peeled off from the solid electrolyte membrane 12 in the manufactured film-attached solid electrolyte membrane 1.

According to the manufacturing method of the film-attached solid electrolyte membrane of this exemplary embodiment, since the contact angle on the surface A of the film 11 is within the above-described predetermined range, the cissing of the solid-electrolyte-membrane-forming composition is restrained even when the solid-electrolyte-membrane-forming composition is coated and the coated film is dried to be cured while the elongated film 11 is continuously fed. Thus, since a so-called "Roll to Roll" production is possible by the manufacturing method of the film-attached solid electrolyte membrane of this exemplary embodiment, the production efficiency is significantly improvable. Since the membrane is typically formed on a mold, the production efficiency of the solid electrolyte membrane has been disadvantageously lowered.

It should be noted that the scope of the invention is not limited to the above-described exemplary embodiments but includes modifications and improvements as long as the modifications and improvements are compatible with an object of the invention.

Though the manufacturing method in the above exemplary embodiment employs the "Roll to Roll" process, the scope of the invention is not limited to such a specific process. For instance, the film-attached solid electrolyte membrane may be manufactured by: coating the solid-electrolyte-membrane-forming composition on a film using a coater such as a doctor blade; and drying the coated composition in an oven.

Though the solid electrolyte membrane is formed on the single surface A of the film 11 in the above exemplary embodiment, the scope of the invention is not limited to such an arrangement.

For instance, the solid electrolyte may also be formed on a second surface opposite the surface A. In such an arrangement, it is preferable that the second surface has a contact angle with respect to acetonitrile in a range from 35 to 75 degrees and a contact angle with respect to chloroform in a range from 15 to 40 degrees.

Further, it is not necessary that the entirety of the surface A of the film has the contact angle within the above range. In other words, it is sufficient that at least an area of the surface A of the film on which the solid electrolyte membrane is formed exhibits the contact angle within the above range.

The components of the composition coated using the coater 30 are not limited to those described in the above exemplary embodiment. The composition coated using the coater 30 may be a composition containing the polymer compound and the metal salt but not containing a solvent (solvent-free composition).

The composition coated using the coater 30 may alternatively be a composition containing a monomer, a polymerization initiator, a metal salt and a solvent. The composition of the above components can cause a polymerization of the monomer by ultraviolet irradiation. When the monomer is polymerized by ultraviolet irradiation as described above, it is preferable that an ultraviolet irradiator is disposed on the downstream of the drier 40. The ultraviolet irradiation conditions (wavelength, intensity, irradiation time etc.) may be appropriately set. In the solid electrolyte membrane formation step, the drier 40 and the ultraviolet irradiator may be combined depending on the components of the composition to be coated in order to cure the coated film.

When the composition containing the monomer, the polymerization initiator, the metal salt and the solvent is used to form the solid electrolyte membrane 12, it is preferable that the mass average molecular weight of the polymer in the solid electrolyte membrane 12 after polymerizing the monomer is in a range from 10,000 to 1,000,000.

When the mass average molecular weight after polymerization is 10,000 to 1,000,000, the processability and moldability of the film-attached solid electrolyte membrane 1 can be enhanced.

Examples of the above monomer include 2-(2-ethoxyethoxy)ethyl acrylate, 2-cyanoethyl acrylate, methoxy polyethyleneglycol methacrylate, methoxy polypropyleneglycol methacrylate, ethoxy polyethyleneglycol methacrylate, ethoxypolypropyleneglycol methacrylate, methoxy polyethyleneglycol acrylate, methoxypolypropyleneglycol acrylate, ethoxy polyethyleneglycol acrylate, ethoxy polypropyleneglycol acrylate, and mixtures thereof.

Examples of crosslinking auxiliary agent for ultraviolet crosslinking reaction for such an arrangement include ethyleneglycol diacrylate, ethyleneglycol dimethacrylate, oligoethyleneglycol diacrylate, oligoethyleneglycol dimethacrylate, propyleneglycol diacrylate, propyleneglycol dimethacrylate, oligopropyleneglycol diacrylate, oligopropyleneglycol dimethacrylate, 1,3-butyleneglycol diacrylate, 1,4-butyleneglycol diacrylate, 1,3-glycerol dimethacrylate, 1,1,1-trimethylolpropane dimethacrylate, 1,1,1-trimethylolethane diacrylate, pentaerythritol trimethacrylate, 1,2,6-hexane triacrylate, sorbitol pentamethacrylate, methylene bisacrylamide, methylene bismethacrylamide divinylbenzene, vinylmethacrylate, vinylcrotonate, vinylacrylate, vinylacetylene, trivinylbenzene, trial lylcyanylsulfide, divinylether, divinylsulfoether, diallylphthalate, glycerol trivinylether, allylmethacrylate, allylacrylate, diallylmalate, diallylfumarate, diallyl itaconate, methylmethacrylate, butylacrylate, ethylacrylate, 2-ethylhexylacrylate, lauryl methacrylate, ethyleneglycol acrylate, triallylisocyanurate, maleimide, phenylmaleimide, p-quinone dioxime, maleic anhydride and itaconic acid, which are used as desired.

It should be noted that the examples of the polymerization initiator, the metal salt, and the solvent are the same as those for the above-described photopolymerization initiator, the metal salt, and the solvent.

It should be noted that, as long as the coated film can be formed using a coater, the composition to be coated may be a composition containing a monomer, a polymerization initiator and a metal salt but not containing a solvent.

EXAMPLES

Though the invention will be detailed below with reference to Examples, the scope of the invention is by no means limited by the Examples.

Example 1

100 parts by mass of polyethylene oxide (PEO) ["ALKOX L-11 (product name)" manufactured by MEISEI CHEMICAL WORKS, LTD.] having a mass average molecular weight of 110,000, 10 parts by mass of lithium bistrifluoromethane sulfonyl imide (LiTFSI), and 500 parts by mass of acetonitrile were blended and sufficiently agitated to prepare a solid-electrolyte-membrane-forming composition. The prepared composition was coated on a release agent layer of "PLS31T161 (product name)" manufactured by LINTEC Corporation [a film having a silicone-resin release agent layer on one surface of a base (polyethylene terephthalate film) of 31 µm thickness] using a die coater, which was dried in a drier, whose temperature gradient was set so that a first drying zone on an upstream was at 80 degrees C. and a second drying zone on a downstream was at 120 degrees C., for ten minutes to obtain a film-attached solid electrolyte membrane. "ALKOX" is a registered trademark.
Cissing The presence of cissing on the obtained film-attached solid electrolyte membrane was visually checked. The results are shown in Table 1. It should be noted that the evaluations are based on the following standards.
A: Variation in the width of the obtained solid electrolyte membrane with respect to a coating width is 10% or less.
B: Variation in the width of the obtained solid electrolyte membrane with respect to a coating width exceeds 10%, or uncoated part occurred due to cissing.
Peelability After transferring the obtained film-attached solid electrolyte membrane to an argon atmosphere whose dew point was controlled at −60 degrees C. or less, the solid electrolyte membrane was removed from the film to evaluate the peelability thereof. The results are shown in Table 1. It should be noted that the evaluations are based on the following standards.
C: Easily peeled off from the film.
D: Not easily peeled off but causes a deformation on the solid electrolyte membrane.

Example 2

100 parts by mass of polyethylene carbonate (PEC) ("QPAC-25 (product name)" manufactured by Empower Materials) having a mass average molecular weight of 120,000, 400 parts by mass of LiTFSI, and 500 parts by mass of chloroform were blended and sufficiently agitated to prepare a solid-electrolyte-membrane-forming composition. A film-attached solid electrolyte membrane was obtained according to the same procedure as that in Example 1. The evaluations were conducted according to the same standards as those in Example 1. "QPAC" is a registered trademark.

Example 3

Except that the used film was changed to "NF SP-PET3801 (product name)" manufactured by LINTEC Corporation [a film having a silicone-resin release agent layer on one surface of a base (polyethylene terephthalate film) of 38 µm thickness], a film-attached solid electrolyte membrane was manufactured in the same manner as that in Example 1. The evaluations were conducted according to the same standards as those in Example 1.

Example 4

Except that the used film was changed to "NF SP-PET3801 (product name)" manufactured by LINTEC Corporation, a film-attached solid electrolyte membrane was manufactured in the same manner as that in Example 2. The evaluations were conducted according to the same standards as those in Example 1.

Example 5

Except that the used film was changed to "NF SP-PET381031C (product name)" manufactured by LINTEC Corporation [a film having a silicone-resin release agent layer on one surface of a base (polyethylene terephthalate film) of 38 µm thickness], a film-attached solid electrolyte membrane was manufactured in the same manner as that in Example 1. The evaluations were conducted according to the same standards as those in Example 1.

Example 6

Except that the used film was changed to "NF SP-PET381031C (product name)" manufactured by LINTEC Corporation, a film-attached solid electrolyte membrane was manufactured in the same manner as that in Example 2. The evaluations were conducted according to the same standards as those in Example 1.

Example 7

Except that the used film was changed to a naflon sheet of 100 µm thickness (manufactured by AS ONE Corporation) and a treatment using a corona treater ("CORONA STATION" manufactured by KASUGA ELECTRIC WORKS LTD) was applied on a surface of the film at a discharge rate of 20 W·min/m², a film-attached solid electrolyte membrane was manufactured in the same manner as that in Example 1. The evaluations were conducted according to the same standards as those in Example 1.

Example 8

Except that the used film was changed to a naflon sheet of 100 μm thickness (manufactured by AS ONE Corporation) and a treatment using a corona treater ("CORONA STATION" manufactured by KASUGA ELECTRIC WORKS LTD) was applied on a surface of the film at a discharge rate of 20 W·min/m², a film-attached solid electrolyte membrane was manufactured in the same manner as that in Example 2. The evaluations were conducted according to the same standards as those in Example 1.

Comparative Example 1

Except that the used film was changed to "PET38 T-100 (product name)" manufactured by Mitsubishi Plastics, Inc., a film-attached solid electrolyte membrane was manufactured in the same manner as that in Example 1. The evaluations were conducted according to the same standards as those in Example 1.

Comparative Example 2

Except that the used film was changed to "PET38 T-100 (product name)" manufactured by Mitsubishi Plastics, Inc, a film-attached solid electrolyte membrane was manufactured in the same manner as that in Example 2. The evaluations were conducted according to the same standards as those in Example 1.

Comparative Example 3

Except that the used film was changed to a nation sheet of 100 μm thickness (manufactured by AS ONE Corporation), a film-attached solid electrolyte membrane was manufactured in the same manner as that in Example 1. The evaluations were conducted according to the same standards as those in Example 1. "Nation" is a registered trademark.

Comparative Example 4

Except that the used film was changed to a naflon sheet of 100 μm thickness (manufactured by AS ONE Corporation), a film-attached solid electrolyte membrane was manufactured in the same manner as that in Example 2. The evaluations were conducted according to the same standards as those in Example 1.

Comparative Example 5

Except that the used film was changed to "PET38 AL-5 (product name)" manufactured by LINTEC Corporation, a film-attached solid electrolyte membrane was manufactured in the same manner as that in Example 1. The evaluations were conducted according to the same standards as those in Example 1.

Comparative Example 6

Except that the used film was changed to "PET38 AL-5 (product name)" manufactured by LINTEC Corporation, a film-attached solid electrolyte membrane was manufactured in the same manner as that in Example 2. The evaluations were conducted according to the same standards as those in Example 1.

Comparative Example 7

Except that the used film was changed to "NF SP-PET3801 (product name)" manufactured by LINTEC Corporation and a treatment using a corona treater ("CORONA STATION" manufactured by KASUGA ELECTRIC WORKS LTD) was applied on a surface of a silicone-resin release agent layer of the film at a discharge rate of 20 W·min/m², a film-attached solid electrolyte membrane was manufactured in the same manner as that in Example 1. The evaluations were conducted according to the same standards as those in Example 1.

Comparative Example 8

Except that the used film was changed to "NF SP-PET3801 (product name)" manufactured by LINTEC Corporation and a treatment using a corona treater ("CORONA STATION" manufactured by KASUGA ELECTRIC WORKS LTD) was applied on a surface of a silicone-resin release agent layer of the film at a discharge rate of 20 W·min/m², a film-attached solid electrolyte membrane was manufactured in the same manner as that in Example 2. The evaluations were conducted according to the same standards as those in Example 1.

It should be noted that the contact angles of the surfaces of the films used in Examples 1-8 and Comparative Examples 1-8 in contact with the solid electrolyte membranes with respect to acetonitrile and chloroform were measured using an automatic contact angle meter DSA100S (manufactured by KRUSS GmbH). The measurement was performed in an atmosphere of 23 degrees C. and 50% RH, where 2 μm of acetonitrile or chloroform was dropped to calculate a static contact angle using a half-angle method. The unit of the contact angle is degree(s). The results are shown in Table 1.

TABLE 1

| | | | Surface Contact Angle (deg.) | | | |
|---|---|---|---|---|---|---|
| | Polymer | Film | Acetonitrile | Chloroform | Cissing | Peelability |
| Ex. 1 | PEO | PLS3T161 | 62.2 | 36 | A | C |
| Ex. 2 | PEC | PLS31T161 | 62.2 | 36 | A | C |
| Ex. 3 | PEO | NF SP-PET3801 | 61.9 | 19 | A | C |
| Ex. 4 | PEC | NF SP-PET3801 | 61.9 | 19 | A | C |
| Ex. 5 | PEO | NF SP-PET381031C | 59.7 | 31 | A | C |
| Ex. 6 | PEC | NF SP-PET381031C | 59.7 | 31 | A | C |
| Ex. 7 | PEO | Naflon sheet | 55.4 | 30.5 | A | C |
| Ex. 8 | PEC | Naflon sheet | 55.4 | 30.5 | A | C |

TABLE 1-continued

| | Polymer | Film | Surface Contact Angle (deg.) Acetonitrile | Chloroform | Cissing | Peelability |
|---|---|---|---|---|---|---|
| Comp. 1 | PEO | PET38 T100 | 13.2 | 6.9 | A | D |
| Comp. 2 | PEC | PET38 T100 | 13.2 | 6.9 | A | D |
| Comp. 3 | PEO | Naflon sheet | 76.3 | 46.2 | B | C |
| Comp. 4 | PEC | Naflon sheet | 76.3 | 46.2 | B | C |
| Comp. 5 | PEO | PET38AL-5 | 31.9 | 4.7 | A | D |
| Comp. 6 | PEC | PET38AL-5 | 31.9 | 4.7 | A | D |
| Comp. 7 | PEO | NF SP-PET3801 | 29.8 | 9.8 | A | D |
| Comp. 8 | PEC | NF SP-PET3801 | 29.8 | 9.8 | A | D |

As shown in Table 1, Examples 1 to 8 show that the fluctuation of the shape of the solid electrolyte membrane due to cissing between the film and the solid electrolyte membrane was restrained and the variation of the width of the solid electrolyte was favorably 10% or less. Further, the solid electrolyte membrane could be easily peeled off from the film under a condition simulating an actual use.

On the other hand, though the fluctuation in the shape of the solid electrolyte membrane due to cissing were not observed in Comparative Examples 1, 2, 5, 6, 7 and 8, the peelability was inferior. On the other hand, though Comparative Examples 3 and 4 showed excellent peelability, fluctuation in the shape of the solid electrolyte membrane due to cissing was observed.

The invention claimed is:

1. A film-attached solid electrolyte membrane comprising:
    a film comprising a surface having a contact angle with respect to acetonitrile in a range from 35 to 75 degrees and a contact angle with respect to chloroform in a range from 15 to 40 degrees; and
    a solid electrolyte membrane in contact with the surface of the film.

2. The film-attached solid electrolyte membrane according to claim 1, wherein
    the solid electrolyte membrane comprises a polymer compound having a mass average molecular weight of 10,000 or more and a metal salt.

3. The film-attached solid electrolyte membrane according to claim 2, wherein the metal salt is a lithium salt.

4. A manufacturing method of a film-attached solid electrolyte membrane, the method comprising:
    coating a solid-electrolyte-membrane-forming composition on a surface of a film that has a contact angle with respect to acetonitrile in a range from 35 to 75 degrees and a contact angle with respect to chloroform in a range from 15 to 40 degrees; and
    curing the coated solid-electrolyte-membrane-forming composition to form a solid electrolyte membrane.

* * * * *